United States Patent
Kochanowicz

(10) Patent No.: US 7,946,021 B1
(45) Date of Patent: May 24, 2011

(54) DOUBLE SAFETY FASTENER

(75) Inventor: Thomas Joseph Kochanowicz, Omaha, NE (US)

(73) Assignees: Thomas J. Kochanowicz, Omaha, NE (US); Sharon Kochanowicz, Omaha, NE (US)

( * ) Notice: Subject to any disclaimer, the term of this patent is extended or adjusted under 35 U.S.C. 154(b) by 0 days.

(21) Appl. No.: 12/554,879

(22) Filed: Sep. 5, 2009

(51) Int. Cl.
*B23P 11/00* (2006.01)
*F16B 37/08* (2006.01)

(52) U.S. Cl. .............. 29/525.02; 29/525.11; 411/433; 411/226

(58) Field of Classification Search ........... 411/222, 411/433, 224, 226; 29/525.02, 525.11
See application file for complete search history.

(56) References Cited

U.S. PATENT DOCUMENTS

| | | | | |
|---|---|---|---|---|
| 380,526 | A * | 4/1888 | Sears | 411/226 |
| 518,474 | A * | 4/1894 | Wallace | 411/230 |
| 655,704 | A * | 8/1900 | Gage | 411/226 |
| 732,590 | A | 1/1902 | Scholer | |
| 1,212,143 | A | 5/1916 | McGurn | |
| 1,353,382 | A * | 9/1920 | Crissinger | 411/226 |
| 1,450,048 | A * | 3/1923 | Patterson | 411/226 |
| 1,777,614 | A * | 10/1930 | Hauger | 411/540 |
| 2,301,634 | A | 2/1941 | Nicholay | |
| 2,776,692 | A | 1/1957 | Granberry | |
| 3,265,109 | A | 8/1966 | Hanfland | |
| 3,908,727 | A | 9/1975 | Osborne | |
| 4,132,146 | A * | 1/1979 | Uhlig | 411/433 |
| 4,220,187 | A | 9/1980 | Holmes | |
| 4,619,122 | A | 10/1986 | Simpson | |
| 4,729,703 | A | 3/1988 | Sato | |
| 4,836,727 | A | 6/1989 | Volkmann | |
| 4,880,343 | A | 11/1989 | Matsumoto | |
| 5,020,949 | A | 6/1991 | Davidson | |
| 6,010,289 | A | 1/2000 | DiStasio et al. | |
| 6,287,065 | B1 * | 9/2001 | Berlin | 411/340 |
| 6,609,867 | B2 | 8/2003 | Wakabayashi | |
| 6,786,690 | B1 | 9/2004 | Yamada | |
| 6,821,070 | B1 * | 11/2004 | Thompson | 411/433 |
| D557,594 | S * | 12/2007 | Whipple | D8/373 |
| 7,661,915 | B2 * | 2/2010 | Whipple | 411/151 |

FOREIGN PATENT DOCUMENTS

| FR | 2917472 A1 | 12/2008 |
|---|---|---|
| JP | 2007187215 A | 7/2007 |

* cited by examiner

*Primary Examiner* — Flemming Saether

(57) ABSTRACT

A double safety fastener prevents accidental disengagement. The double safety fastener is composed of a first and second threaded fastener. The two fasteners are joined with a pivotable protrusion extending from the first fastener into a recess of the second fastener. When both fasteners are engaged with a threaded rod, torque is transferred from the second fastener to the first fastener through the protrusion, recess interface. If the second fastener disengages the threaded rod, the second fastener will swing away from the threaded rod eliminating transfer of torque to the first fastener, thus eliminating the disengagement of the first fastener from the threaded rod. Conversely reengaging the disengaged second fastener to the threaded rod is accomplished by rotating (typically clockwise) and pressing the second fastener toward the first fastener thereby catching the beginning thread of threaded rod.

2 Claims, 5 Drawing Sheets

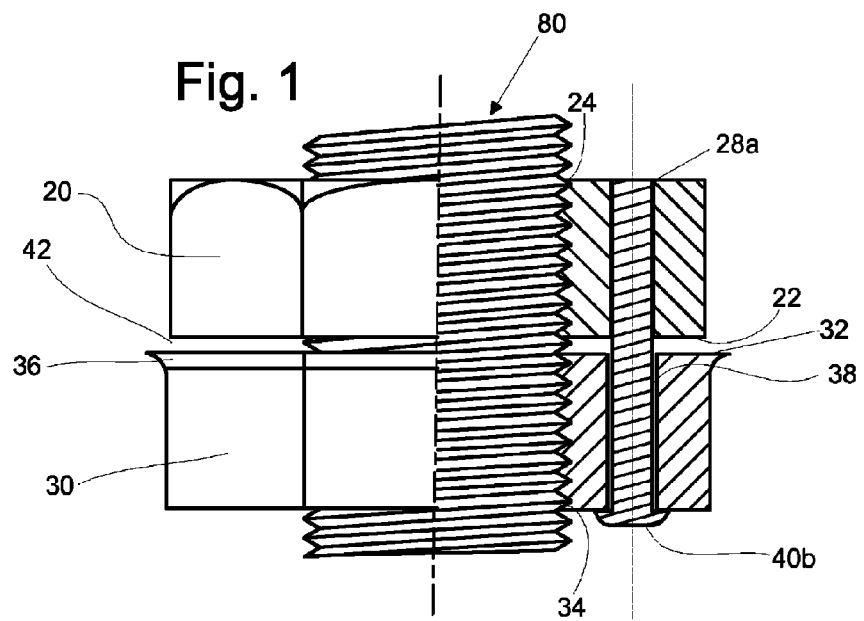
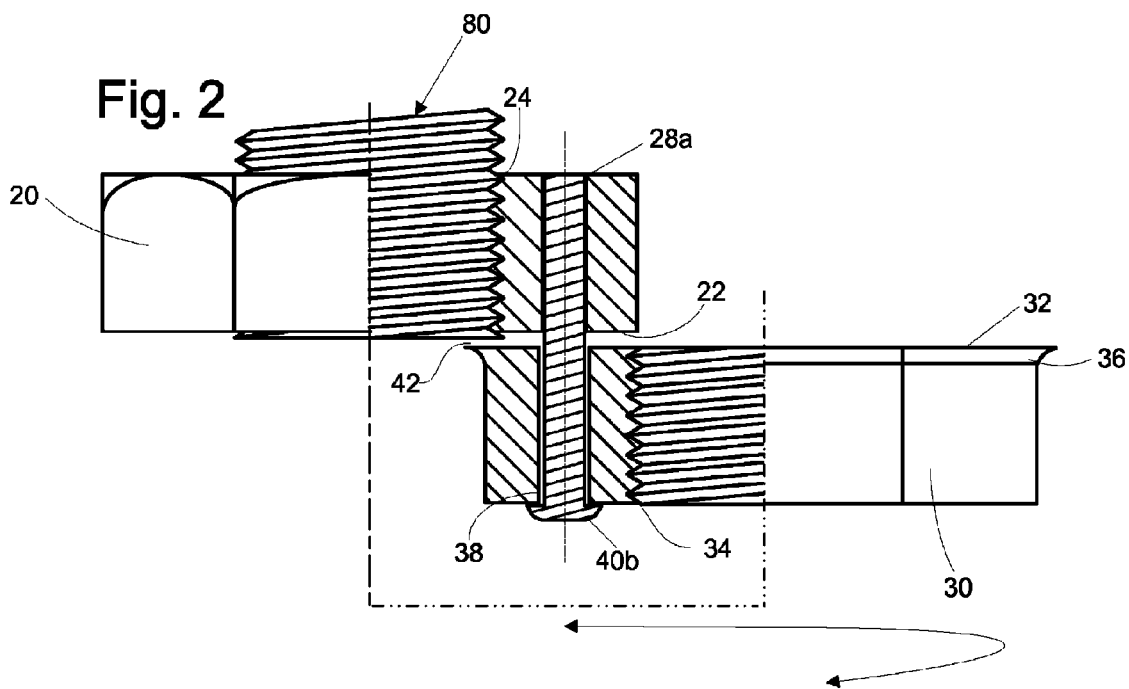

DOUBLE SAFETY FASTENER

CROSS-REFERENCE TO RELATED APPLICATIONS

None.

FEDERALLY SPONSORED RESEARCH

None.

SEQUENCE LISTING

None.

BACKGROUND

1. Field

The present embodiment relates to a threaded safety fastener that prevents the fastener from becoming completely disengaged from a threaded surface.

2. Prior Art

This embodiment relates to threaded fastening methods, specifically to threaded nut fasteners where complete disengagement of a threaded fastener may cause undesirable results. The present applicant developed this embodiment to prevent a threaded fastener, used for adjusting a motorized mechanism, from becoming completely disengaged from a threaded adjusting rod when loosening. If the threaded adjusting fastener where allowed to become completely disengaged from the adjusting rod, the motorized mechanism would fall, possibly causing injury and damage. A method was needed to prevent the threads of the adjusting fastener from fully disengaging the threads of the adjustment threaded rod when coming to the end of the threaded rod's threads.

In view of these problems, an object of the present embodiment is to provide a dual safety fastener assembly whose constituent fastener can surely be loosened without concern for complete disengagement from the threads it engages.

The present embodiment describes a fastener, split in two, thereby having a first fastener and a second fastener. The threaded bore of the first fastener is centered coaxially as is the threaded bore of the second fastener. The force for adjusting the double fastener assembly is applied to one fastener, commonly done with a wrench or by hand. Importantly, the embodiment functions operationally the same regardless of which fastener torque is applied to, in other words, either the first fastener or second fastener. However, for clarity, the description is for that in which torque is applied to the second fastener. To transfer the force from the second fastener to the first fastener, a protrusion in the first fastener is coaxially aligned with a pivotable recess in the second fastener. The protrusion of the first fastener extends from the bottom side of the first fastener, fitting into the recess of the top side of the second fastener. The first fastener protrusion and second fastener recess share a common axis. It is noted that the protrusion and recess share a common axis. The first fastener's threaded bore and second fastener's threaded bore, only share a common axis when both are engaged with a threaded rod. The recess diameter in the second fastener is slightly larger than the cylindrical protrusion of the first fastener, allowing the protrusion to pivot within the recess. It is important to note that the second fastener can only transfer torque to the first fastener when both first and second fasteners threaded bores are engaged with the threaded rod.

Importantly, the first fastener protrusion and second fastener recess are axially aligned, and are adjacent to their respective threaded bore centers. The concentric pivot point for the first fastener protrusion and aligning second fastener recess resides between the outer parameter of their respective fastener and centered threaded bore. It is further noted that a slight space exists between the adjoining first fastener and second fastener where there surfaces abut.

The threaded bores are centered unto themselves for both the first fastener and second fastener. The axis for the first fastener and second fasteners threaded bores are centered to each other only when the first fastener and second fastener threads are concurrently engaged with a common threaded rod. It is also noted upon loosening the constituent second fastener; its threads will be first to completely disengage from the threaded rod leaving the first fastener as the means of support for the mechanism being adjusted. Any further attempt to disengage the first fastener causes the second fastener to swing away from the first fastener in an eccentric manner, pivoting on the common axis of the first fastener protrusion and second fastener recess. It is further noted that when the second fastener is completely disengaged from the threaded rod, the first fastener and second fastener are still attached by the first fastener protrusion and second fastener recess. Any further attempt to disengage the first fastener by applying rotational torque to the second fastener will cause the second fastener to encircle eccentrically the first fastener on their shared axis thus eliminating any rotational torque to the first fastener.

It is important to note that the second fastener can reengage the threaded rod after being disengaged from the threaded rod. With sufficient pressure on the second fastener, rotated in the direction to engage the threaded rod, the second fastener will swivel until the first and second fasteners threaded bores are coaxially aligned. Once both fasteners are aligned concentrically, the second fasteners threads will catch the beginning thread of the threaded rod causing the second fastener to engage the threaded rod's threads. Once both fasteners are engaged, adjustment to a device supported by the threaded rod can once again proceed.

U.S. Pat. No. 6,609,867 to Wakabayashi (2002) shows an upper nut and lower nut that engage with each other in an eccentric manner to afford the so-called wedging effect of inhibiting them from loosening themselves. While effective in preventing the constituent nuts from loosing, they afford no advantage from complete disengagement from a threaded rod once loosened. Furthermore, the wedging, or binding of threads ultimately causes excessive wear and weakens the threaded surface reducing their effectiveness. Further, the fastener is overly complex and expensive to manufacture.

Another radical attempt to prevent a fastener from loosening includes U.S. Pat. No. 4,220,187 to Holmes (1980). Here the inventor uses a skewed or deformed fastener to put lateral pressure against the threads, potentially weakening and shearing away the threads of the fastener. Furthermore the design affords no advantage when loosened to prevent complete disengagement from a threaded surface.

U.S. Pat. No. 3,908,727 to Osborne (1975) is another attempt to prevent a fastener from loosening, including applying deformable materials on the threads to prevent them from loosening thereby potentially causing the fastener to gum up and jam. Here the design offers little advantage over applying an aftermarket liquid to the threads to prevent loosening. Furthermore the design affords no advantage when loosened to prevent complete disengagement from a threaded surface.

Like the almost innumerable embodiments for threaded fastener that claim anti-loosening properties, the designs afford no advantage when loosening to prevent complete disengagement from a threaded surface.

SUMMARY

The embodiment, an improved double threaded safety fastener, comprises a first fastener and a second fastener. The two fasteners are pivotably connected by a cylindrical shaped protrusion in the first fastener that protrudes into an axially aligned cylindrical recess in the second fastener, slightly larger in diameter than the first fastener protrusion. The protrusion and accepting recess are between the centered threaded bore and outer circumference of their respective fasteners. Therefore when the first and second fasteners threads are engaged on a common threaded rod, torque applied to the second fastener, transfer's to the first fastener via the protrusion, recess interface. This allows the double fastener assembly to progress along the threaded rod in accordance with the rotation of the second fastener so long as the second fasteners threads are engaged with the threaded rod.

Accordingly, if the second fastener disengages from the threaded rod, the second fastener swings away from the first fastener, pivoting on the now common axis of the protrusion, recesses interface. The second fastener continues to rotate eccentrically to the first fastener so long as the second fastener is rotated in a disengaging direction (usually counter-clockwise) in relation to the threaded rod.

Accordingly, sufficient pressure against the second fastener, rotated in the proper direction to reengage the threaded rod (usually clockwise) allows the edge of the second fasteners threads to catch the beginning thread on the threaded rod, enabling reengagement and axially realigning with the first fastener and threaded rod.

DRAWINGS

The foregoing objects, and others, will in part be obvious and in part pointed out more fully hereinafter in conjunction with the written description of the embodiment illustrated in the accompanying drawings in which:

FIG. 1 is a side elevation view of the double fastener and partly in cross section;

FIG. 2 is a side elevation view of the double fastener shown in FIG. 1 partly in cross section with the second fastener disengaged from the threaded rod;

REFERENCE NUMERALS

Figure 3:
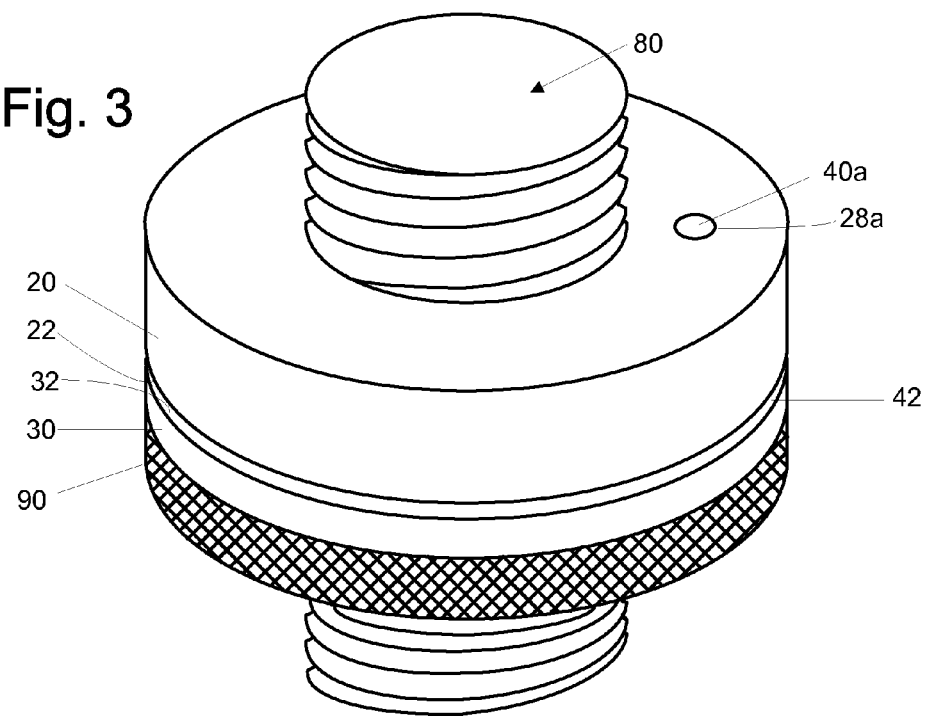
FIG. 3 is a perspective view of the double fastener engaging a threaded rod, with the second fastener knurled for hand adjustments; accordingly displaying other possible designs of the present embodiment.

| | |
|---|---|
| 20 | first fastener |
| 22 | first fastener bottom side |
| 24 | first threaded bore |
| 28a | press fit recess |
| 28b | threaded recess |
| 30 | second fastener |
| 32 | second fastener top side |
| 34 | second threaded bore |
| 36 | lip |
| 38 | second fastener recess |
| 40a | spring pin protrusion |
| 40b | pin protrusion |
| 40c | threaded protrusion |
| 42 | gap |
| 80 | threaded rod |
| 90 | knurled surface |
| 100 | motor |
| 105 | motor flange |

DETAILED DESCRIPTION

FIGS. 1 and 2 of the drawing illustrate a side elevation view of the embodiment, partly in cross section view. A first fastener 20 of the double safety fastener engaged with the external threads of a threaded rod 80. Likewise FIG. 1 shows the second fastener 30 of the double safety fastener engaged with the threaded rod 80. Notably the first fastener bottom side 22 faces the second fastener top side 32. FIG. 2 shows the second fastener 30 disengaged from the threaded rod 80. The first and second double safety fasteners 20 and 30 may be of any shape or type, though they are shown as hexagonal nuts in the illustrated embodiment. The first and second threaded bores 24 and 34, respectively are formed axially of and through the respective first fastener 20 and second fastener 30.

Formed integral with the first fastener 20 and press fit recess 28a is a pin protrusion 40b press fitted into the press fit recess 28a. The pin protrusion 40b extends through the second fasteners 30 second fastener recess 38 which is slightly larger than the pin protrusion 40b. The slightly larger second fastener recess 38 allows the second fastener 30 to pivot axially on the pin protrusion 40b when the second fastener is not engaged with the threaded rod 80. The second fastener 30 preferably has a lip 36 extending around the hexagonal upper edge of the second fastener 30 so as to bear against the lower end face of a fastening tool. The tool may be a dodecagonal or hexagonal socket of a box wrench. The lip 36 prevents a fastening tool, like a socket or a box wrench tool from extending past the second fastener 30 onto the first fastener 20. FIG. 1 depicts first fastener 20 and second fastener 30 engaged with the threaded rod 80. Hence, force applied to the second fastener 30 in a manner to further ascend or tighten the threaded adjusting rod 80, typically clockwise, transfers torque to the top half nut 20 by way of the pin protrusion 40b and press fit recess 28a interface. Furthermore FIG. 1 depicts that once the first threaded bore 24 and second threaded bore 34 are engaged with the threaded rod 80, the fulcrum point is the axial center of the threaded rod 80. Thus subsequent torque applied to the bottom half nut 30 to ascend the threaded rod 80 causes the double safety fastener embodiment to ascend the threaded rod 80.

FIG. 2 shows the embodiment of FIG. 1 with only the first fastener 20 engaged with the threaded rod 80. Notably the first fastener bottom side 22 faces the second fastener top side 32. The second fastener 30 is disengaged completely from threaded rod 80. Importantly, the second fastener 30 is shown pivoting away from the first fastener 20. The pivoting motion occurs when the second fastener 30, second threaded bore 34 completely disengages the threaded rod 80. Further stated, disengagement occurs once the second fastener 30 disengages from the end of threaded rod 80. Once disengaged, the second fastener 30 pivots away from the first fastener 20 leaving only the first fastener 20 engaging the threaded rod 80. A slight gap 42 is provided between the first fastener 20 and second fastener 30 to allow the pivot to occur. Once disengagement of the second fastener 30 occurs, the fulcrum point shifts for the second fastener 30 from threaded rod 80 center to fulcrum point of pin protrusion 40b center. Also noted in FIG. 2, the first fastener 20 and threaded rod 80 centers are no longer axially aligned with the second fastener 30. Any further attempt to un-screw or loosen the first fastener 20 from the threaded rod 80 by un-screwing second fastener 30 will be futile. At that point the second fastener 30 will eccentrically encircling the first fastener 20 and threaded rod 80 assembly, pivoting on pin protrusion 40b. This in effect disables the ability to further disengage or loosen the first fastener 20 from the threaded rod 80.

Furthermore once the second fastener 30, second threaded bore 34 is disengaged from the threaded rod 80, re-engagement with the threaded rod 80 is possible. With sufficient upward pressure against the second fastener 30 toward the threaded rod 80, and rotated in the proper direction, typically clockwise, the second fasteners 30, second threaded bore 34 leading threads, engages the first thread of the threaded rod 80, thereby enabling continued adjustment of the embodiment.

FIG. 3 shows another design from a perspective view of the embodiment. The first fastener 20 and second fastener 30 threads are both engaged with the threaded rod 80. Notably the first fastener bottom side 22 faces the second fastener top side 32. FIG. 3 is functionally equivalent to illustrations FIG. 1 and FIG. 2 with the exception of the outer periphery of the embodiment being in a cylindrical shape. Furthermore since adjustments are done with the second fastener 30, the lower outer surface of the second fastener 30 is knurled 90 for hand adjustment. Preferably the first fastener 20 is slightly smaller in diameter than the second fastener 30 to ensure hand adjustment grip is applied only to the knurled surface 90 of the second fastener 30.

Figure 4:
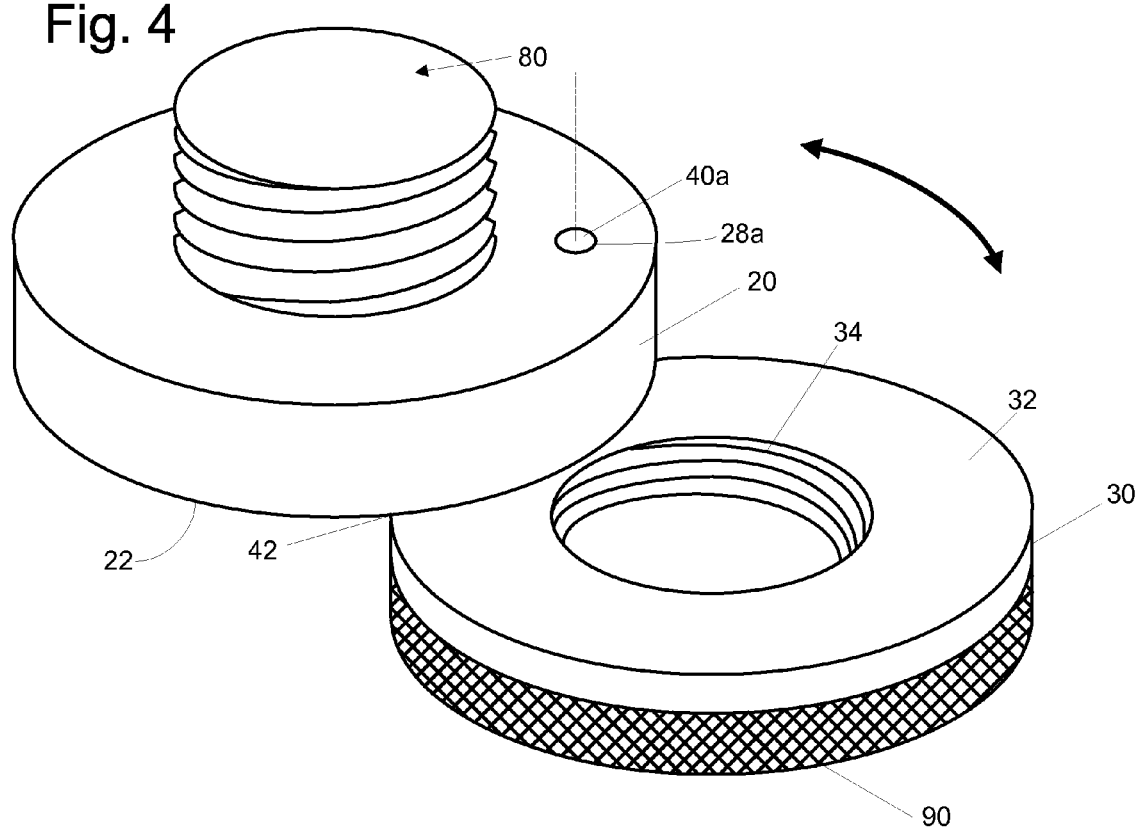
FIG. 4 is perspective views of the double fastener shown in FIG. 3 displaying the second fastener disengaged from a threaded rod.

FIG. 4 shows the embodiments of FIG. 3 with the first fastener 20 engaging the threaded rod 80 while the second fastener 30 second threaded bore 34 is disengaged and swung away from the threaded rod 80. Second fastener 30 pivots on spring pin protrusion 40a in the direction illustrated.

Figure 5:
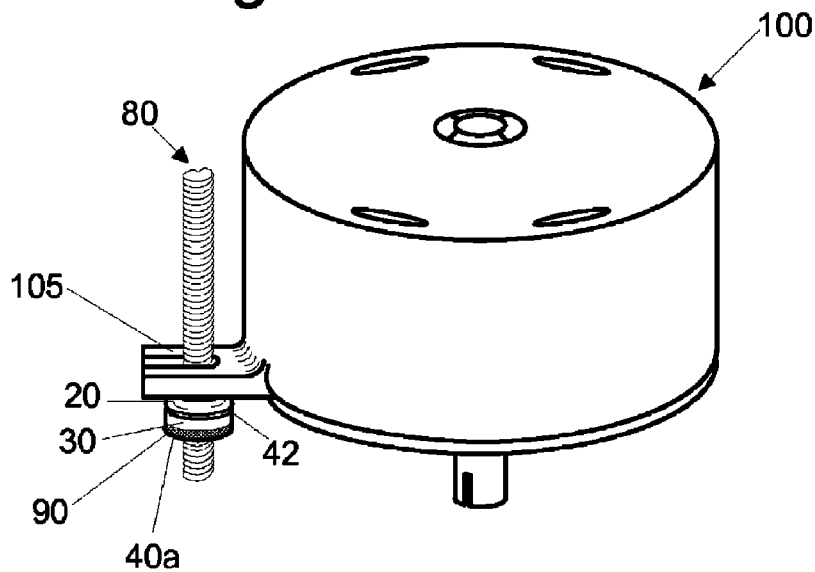
FIG. 5 is a partial perspective view of the double fastener shown in FIG. 3 supporting a motor embodiment.

FIG. 5 is a partial perspective view of the embodiment supporting a motor 100 by motor flange 105. Both first fasteners 20 and second fastener 30 engage threaded rod 80 under motor 100 motor flange 105.

Figure 6:
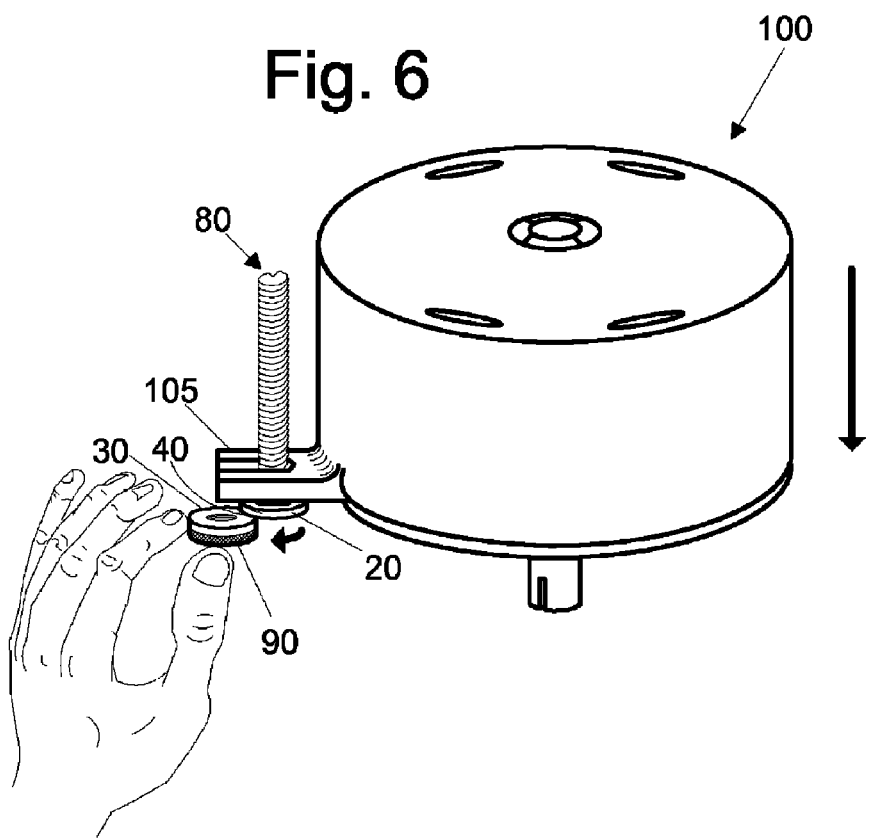
FIG. 6 is a partial perspective view of the double fastener shown in FIG. 4 with only the top half nut supporting a motor embodiment.

FIG. 6 is a partial perspective view of FIG. 5 showing a motor 100 adjusted to its lowest point possible. Second fastener 30 is disengaged from threaded rod 80 and swung away from motor assembly 100. First fastener 20 prevents the motor from falling.

Figure 7:
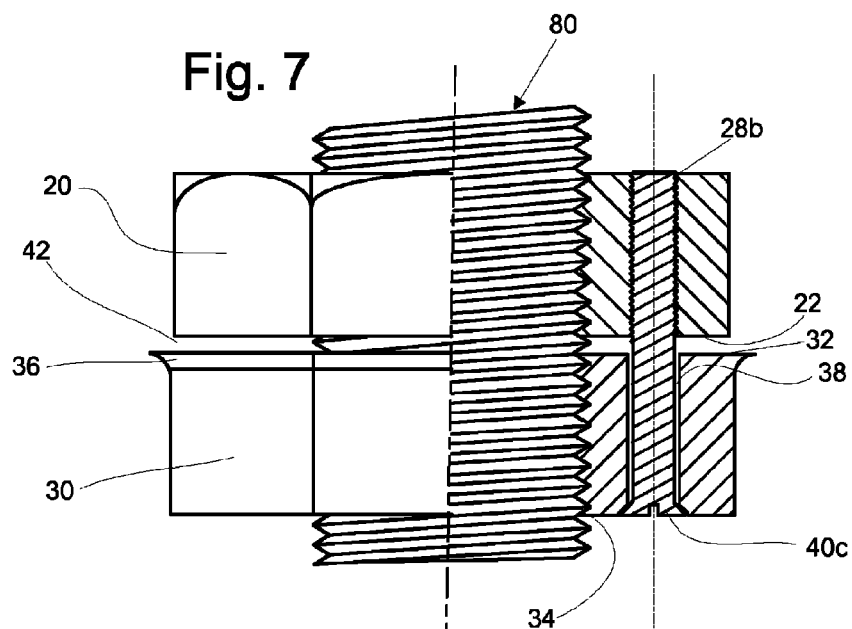
FIG. 7 is a similar side elevation view of the double fastener shown in FIG. 1 utilizing a threaded protrusion.
Figure 8:
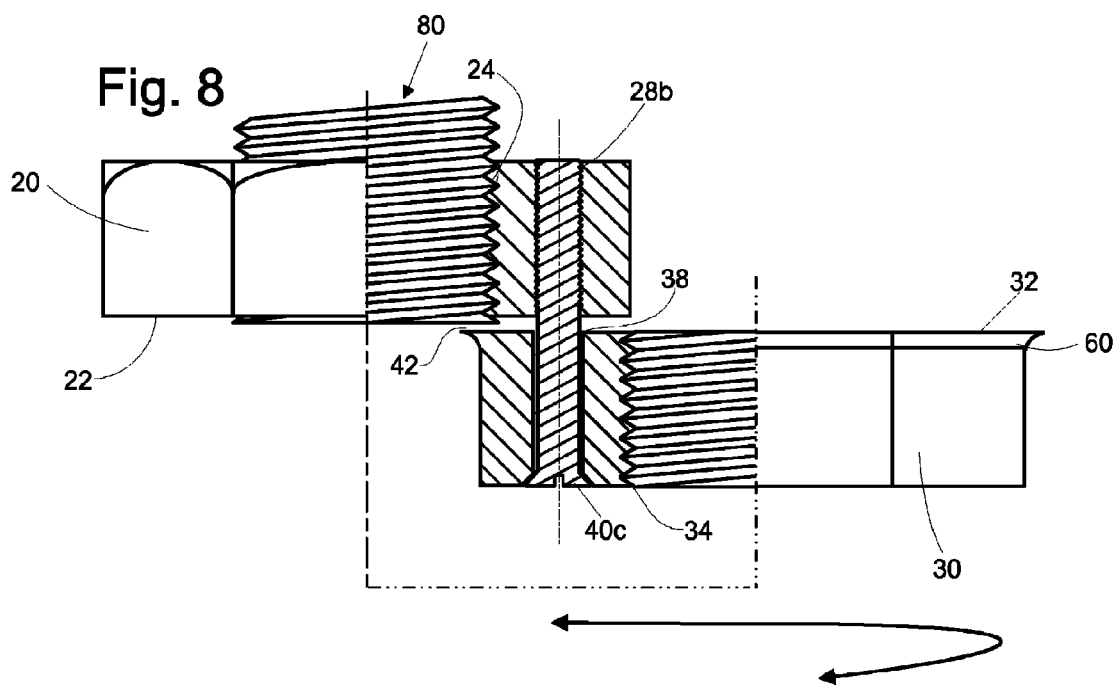
FIG. 8 is a similar side elevation view of the double fastener shown in FIG. 2 utilizing a threaded protrusion having the second fastener disengaged from the threaded rod.

FIG. 7 and FIG. 8 of the drawing illustrate a side elevation view of the embodiment, partly in cross section view. Further, the first fastener bottom side 22 faces the second fastener top side 32. Functionally the same as described in FIGS. 1 and 2. However, structurally a threaded protrusion 40c and threaded recess 28b allow for adjustability of the width of the gap 42.

Figure 9:
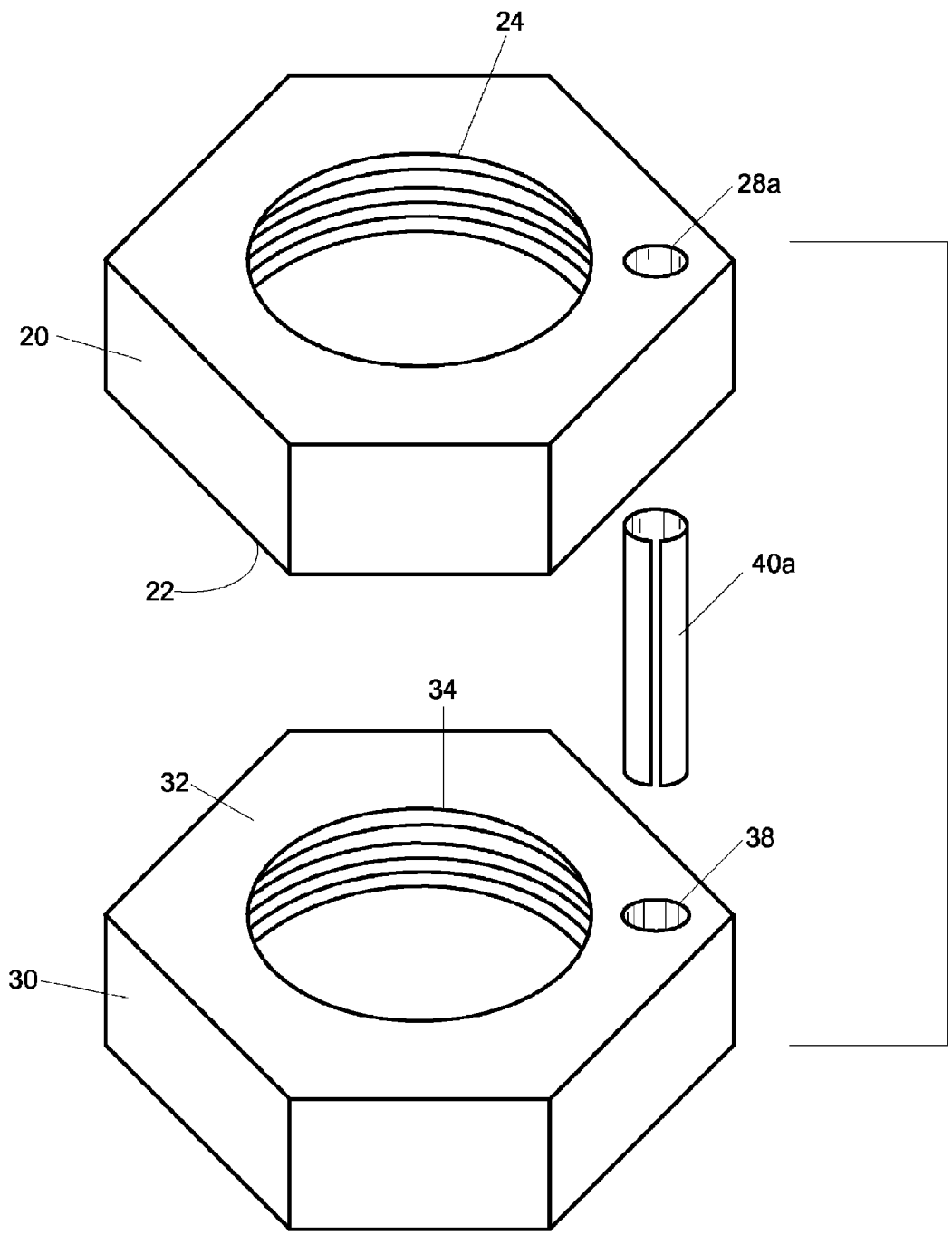
FIG. 9 is an exploded view of the present embodiment.

FIG. 9 is a top perspective exploded view of the embodiment illustrating the assemblage of the double safety fastener. Further, first fastener bottom side 22 faces the second fastener top side 32. Notably, pin protrusion 40a secures into press fit recess 28a of first fastener 20; whereas, protrusion 40a is rotatable freely in second fastener recess 38 of second fastener 30 only when both first fastener 20 and second fastener 30 are concurrently engaged with a threaded rod, not shown. Top threaded bore 24 and bottom threaded bore 34 share the same thread pitch.

The present embodiment is not delimited to the embodiments described above, but they can be modified in any suitable manner within the technical concept disclosed in this text. For example, overall configuration of the top half nut 20 and bottom half nut 30 is a matter of design choice. They may not necessarily be of a hexagonal shape but be of an octagonal or any other polygonal shape (viz., substantially equilateral polygon in plain view), or may be round nuts. These and other modifications of the embodiment disclosed herein as well as other embodiments of the invention will be obvious or suggested to those skilled in the art from the disclosure herein, whereby the foregoing descriptive matter is to be interpreted merely as illustrative of the present embodiment and not as a limitation.

Operation

In operation (FIGS. 5 and 6), one uses the double safety fastener embodiment on a threaded rod 80 or bolt where complete disengagement of a fastener from a threaded rod 80 may cause undesirable results such as motor 100 becoming disengaged and falling. For example, first fastener 20 and second fastener 30 are both engaged with threaded rod 80 therefore, motor 100 can be adjusted up or down by grasping knurled surface 90 and rotating clockwise or counter-clockwise thus adjusting vertical position of motor 100. As noted in FIG. 6, loosening the double safety fastener to the end of the threaded rod 80 causes the second fastener 30 to swing away from the first fastener 20. This leaves only the first fasteners 20 threads engaged with the threaded rod 80 against the motor flange 105 which supports the motor 100; any further effort to loosen the double safety nut results in the second fastener 30 eccentrically encircling the threaded rod 80 and saving the motor 100 from falling.

When the user wishes to tighten the double safety nut embodiment after the second fastener 30 is disengaged from threaded rod 80, pressure asserted against the second fastener 30 in the upward vertical direction toward the threaded rod 80 and turned in the direction to tighten, typically clockwise, results in the second fasteners 30 first thread reengaging the beginning thread of the threaded rod 80 and thus resuming the ability to adjust the motors 100 vertical position.

Operational requirements for adjusting a heavier motor 100 may require more torque thus requiring a tool such as a wrench for adjustments. In which case, using the design with the hexagonal periphery shown in FIGS. 1 and 2, accomplishes the same result described above.

Advantages

From the description above, a number of advantages of the double safety fastener become evident:

(a) The double safety fastener allows adjustments to be made without concern of accidentally disengaging a threaded fastener completely from a threaded rod. An application where this is advantageous is for wood workers who commonly mount an inverted motorized device called a router, under a table. Accidentally lowering the router past its threaded rod lowest setting could result in the router becoming disengaged and falling. In and of itself, having a motorized device fall would be dangerous; a router typically has a sharp rotating cutting bit, rotating at a high rate of speed, capable of cutting swiftly through wood. Preventing the router from falling in this case would prove crucial.

(b) The present embodiment puts no unnatural stress on a threaded rod and does not rely on deformable materials, sticky chemicals or binding of threads as some of the prior art does to prevent disengagement of a fastener from a threaded surface.

(c) The present embodiment offers a visual notification that the double safety fastener is nearing the end of the threaded rod. For example, if one end of the double safety fastener swivels away from the other fastener and the threaded rod assemblage, one can visually notice the remaining fastener is nearing the end of the threaded rod.

(d) Furthermore, during hand adjustment, where a fastener is not visible, one could easily feel one end of the double safety fastener swivel away from the other threaded engaged fastener, thereby avoiding a potentially dangerous situation. For example, when used in an environment such as outer space, a fastener becoming completely disengaged and floating into space could prove expensive and dangerous.

(e) Because of the embodiment's eccentrical movement when nearing the end of a threaded rod, an electrical mechanical, electronic eye or electronic switch could monitor movement and trigger an alert warning that the embodiment is nearing complete disengagement.

(f) Uniquely, once one end of the double safety fastener becomes disengaged from the threaded rod, reengagement would simply entail rotating the disengaged fastener in the opposite direction to reengage the threaded rod, such that the beginning thread of the disengaged fastener catches the beginning thread of the threaded rod, thereby resuming full engagement with the other half of the already assembled fastener and threaded rod.

CONCLUSION, RAMIFICATIONS, AND SCOPE

Although the description above contains many specifications, these should not be construed as limiting the scope of the embodiments but as merely providing illustrations of some of the presently preferred embodiments. For example, the double safety fastener can have other shapes. Furthermore, increasing the thickness of the double safety fastener would provide a larger safety margin before the fastener(s) became disengaged from the threaded rod by providing more threadable surface area.

Thus the scope of the embodiments should be determined by the appended claims and their legal equivalents, rather than by the examples given.

I claim:

1. A method of preventing a double safety fastener from becoming completely disengaged from an end of a threaded rod comprising the following steps:
    (a) providing a threaded rod with an end;
    (b) providing a double safety fastener on the threaded rod, the double safety fastener comprising a first fastener with a first uninterrupted threaded bore having a first axis and a second fastener with a second uninterrupted threaded bore having a second axis, the first and second fasteners being pivotally conjoined by a protrusion extending from one of said first and second fasteners and received in a recess interface in the other of said first and second fasteners, the protrusion and recess have an axis parallel to the first and second axis such that the first and second fasteners are capable of pivoting relative to one another;
    (c) providing a torque to only one of the said first and second fasteners and transferring the torque to the other of the first and second fasteners by way of the conjoined pivot to rotate the double safety fastener and have it progress along the threaded rod;
    (d) progressing the double safety fastener to the end of the threaded rod and disengaging only the torque receiving one of the first and second fasteners from the end of the threaded rod and have it pivot along the pivot axis and swing away from the threaded rod and leave the other of the first and second threaded fasteners safely engaged with the rod.

2. The method of claim 1 further comprising the steps:
    (e) re-aligning the first axis and the second axis;
    (f) turning the double safety fastener to have the fastener which was swung away re-engage the threaded rod.

* * * * *